(12) United States Patent
Permuy

(10) Patent No.: US 9,467,064 B2
(45) Date of Patent: Oct. 11, 2016

(54) HIGH POWER CONVERTER WITH LOW POWER TRANSISTORS CONNECTED IN PARALLEL

(75) Inventor: Alfred Permuy, Rueil-Malmaison (FR)

(73) Assignee: GE ENERGY POWER CONVERSION TECHNOLOGY LTD., Rugby Warwickshire (GB)

( * ) Notice: Subject to any disclaimer, the term of this patent is extended or adjusted under 35 U.S.C. 154(b) by 43 days.

(21) Appl. No.: 14/342,256

(22) PCT Filed: Aug. 30, 2012

(86) PCT No.: PCT/EP2012/066916
§ 371 (c)(1),
(2), (4) Date: Feb. 28, 2014

(87) PCT Pub. No.: WO2013/030307
PCT Pub. Date: Mar. 7, 2013

(65) Prior Publication Data
US 2014/0218993 A1    Aug. 7, 2014

(30) Foreign Application Priority Data
Sep. 1, 2011    (FR) ...................... 11 57748

(51) Int. Cl.
*H02M 7/537*    (2006.01)
*H02M 1/088*    (2006.01)

(52) U.S. Cl.
CPC ............. *H02M 7/537* (2013.01); *H02M 1/088* (2013.01)

(58) Field of Classification Search
CPC ............. H02M 1/088; H02M 7/5387; H02M 7/53871; H02M 7/53873; H02M 7/539; H02M 7/5395
See application file for complete search history.

(56) References Cited

U.S. PATENT DOCUMENTS

| | | | | |
|---|---|---|---|---|
| 3,872,362 A | * | 3/1975 | Lecoeuche | B60L 7/003 318/139 |
| 4,639,849 A | * | 1/1987 | Noworolski | H02M 1/34 363/132 |

(Continued)

FOREIGN PATENT DOCUMENTS

| | | |
|---|---|---|
| CN | 1537355 A | 10/2004 |
| CN | 1835332 A | 9/2006 |

(Continued)

OTHER PUBLICATIONS

Laker, Kenneth. "Electornic Circuits—Modeling and Measurement Techniques". Sep. 14, 2008. University of Pennsylvainia, Moore School of Electrical Engineering. pp. 1-14.*

(Continued)

*Primary Examiner* — Harry Behm
*Assistant Examiner* — Peter Novak
(74) *Attorney, Agent, or Firm* — GE Global Patent Operation; Catherine J. Toppin

(57) ABSTRACT

A system for converting a first electric voltage into a second electric voltage, comprising: at least two input terminals and two output terminals; and switching members disposed between the terminals, which can convert the first voltage into the second voltage. At least one switching member comprises at least two arms connected in parallel and each arm includes an electronic switch that can be controlled such as to occupy either an on-state or an off-state, said switch comprising a control electrode and two conduction electrodes that conduct current in the on-state. The switching member comprises a common control terminal connected to the control electrode of the switch of each arm, as well as a first common conduction terminal and a second common conduction terminal connected respectively to a first conduction electrode and a second conduction electrode of the switch of each of the arms.

10 Claims, 2 Drawing Sheets

(56) References Cited

U.S. PATENT DOCUMENTS

| | | | | |
|---|---|---|---|---|
| 4,695,935 | A | * | 9/1987 | Oen .................. H02M 3/33569 136/293 |
| 5,373,201 | A | * | 12/1994 | Pinder et al. ................. 307/113 |
| 6,016,258 | A | * | 1/2000 | Jain ........................ H02M 1/38 363/132 |
| 6,483,724 | B1 | * | 11/2002 | Blair ....................... H02M 1/44 363/132 |
| 7,164,253 | B2 | | 1/2007 | Sato et al. |
| 7,253,540 | B1 | * | 8/2007 | Thalheim ............. H03K 17/122 307/115 |
| 2002/0067631 | A1 | * | 6/2002 | Lunding et al. ............. 363/131 |
| 2009/0196082 | A1 | * | 8/2009 | Mazumder ............ H02M 5/458 363/132 |
| 2012/0187879 | A1 | * | 7/2012 | Galea et al. ............. 318/400.29 |

FOREIGN PATENT DOCUMENTS

| | | | |
|---|---|---|---|
| EP | 0525959 B1 | | 8/1995 |
| EP | 0409384 B1 | * | 11/1995 ............ H02M 1/088 |
| FR | 1506171 A | | 12/1967 |

OTHER PUBLICATIONS

EMC Improvement Guidelines, Aug. 31, 2003, pp. 1-17.
Translated PCT International Search Report from corresponding International Application No. PCT/EP2012/066916.
Unofficial English Translation of Chinese Office Action issued in connection with corresponding CN Application No. 201280053910.5 on Jan. 15, 2016.

* cited by examiner

HIGH POWER CONVERTER WITH LOW POWER TRANSISTORS CONNECTED IN PARALLEL

FIELD OF THE INVENTION

Embodiments of the present invention relate to a system for the conversion of an initial electric voltage into a second electric voltage, in particular to conversion systems with high electrical power, such as power in excess of 1 MW.

BACKGROUND OF THE INVENTION

There is a voltage converter of the type mentioned above. The converter is a three-phase voltage inverter comprising two terminals with continuous input voltage and one output terminal for each phase of the three-phase output voltage. The three-phase inverter includes two switching paths for each phase. Each switching path is connected between the corresponding output terminal and the respective input terminal and includes a switching element. The switching elements are suitable for converting the continuous input voltage into the alternative output voltage.

In order to allow the circulation of a current of greater strength, each switching element comprises two controllable electronic switches connected in parallel, the control electrodes, and the conduction electrodes of the two switches respectively connected between them. The switches are identical so that the current is distributed as equally as possible between the two switches.

However, the two switches do not always have identical electrical characteristics, and are generally subjected to thermal conditions that differ from one switch to another depending on their arrangement. This results in an imbalance in the current between the two switches, in particular during the switching phases of the switches; in certain cases, the imbalance causes the destruction of one of the two switches.

BRIEF SUMMARY OF THE INVENTION

Embodiments of the present invention propose a conversion system making it possible to reduce the imbalance in the current between the switches arranged in parallel arms of a switching element during the switching phases of the switches, while also delivering a current having the same voltage and the same strength.

Embodiments of the present invention include: at least two input terminals and two output terminals, switching elements, positioned between the input terminals and the output terminals, which are suitable for converting the first voltage into the second voltage, at least one switching element which includes at least two arms connected in parallel, where each arm comprises an electronic switch that can be switched on and off, the switch comprising a control electrode, two conduction electrodes, and with a current that is suitable to circulate between the conduction electrodes in the "on" state, and that switching element must comprise at least a shared control terminal connected to the control electrode of the switch of each arm connected in parallel, as well as a first shared conduction terminal and a second shared conduction terminal connected to a first conduction electrode, respectively to a second conduction electrode of the switch of each arm connected in parallel.

In an embodiment of the present invention a conversion system of the aforementioned type, characterized by the fact that it has at least one switching element for each arm connected in parallel, as well as an inductor connected between a common electrode among the two conduction electrodes and the corresponding shared conduction terminal; the inductor has a value greater than 10 nH and is more or less identical for each of the arms connected in parallel.

In an embodiment of the present invention, the conversion system includes one or several of the following characteristics, taken in isolation or following all technically possible combinations: the system includes at least two switching elements comprising at least two arms connected in parallel; these switching elements are connected in series, and they each include a capacitor connected between the first shared conduction terminal and the second shared conduction terminal, the aforementioned switching elements comprise one or more capacitors connected in parallel in the arms, in the absence of a resistor connected in series with a corresponding capacitor, each switching element includes at least two arms connected in parallel, with each arm comprising a controllable electronic switch, the electronic switch comprises at least one transistor among the group which includes: a bipolar transistor, a field-effect transistor, an IGBT transistor and an IEGT transistor, the aforementioned electrode among the two conduction electrodes is the emitter electrode when the transistor is a bipolar transistor, a IGBT transistor or a IEGT transistor, and the aforementioned electrode among the two conduction electrodes is the source electrode when the transistor is a field-effect transistor, the electronic switch comprises a range of transistors connected in series, the inductor has a value of between 10 nH and 100 nH, the system also includes a printed circuit comprising conductor tracks between the electronic switches, and the inductor is a portion of track having a length greater than 1 cm, the inductor is a portion of track with a length of between 1 cm and 10 cm, and this portion of track has a width of between 1 mm and 5 mm.

BRIEF DESCRIPTION OF THE DRAWINGS

These characteristics and advantages of the invention will become apparent when reading the following description, which is given solely as an example, and refers to the attached drawings, of which.

DETAILED DESCRIPTION

An embodiment of the present invention relates to a system 10 for the conversion of an initial electrical voltage into a second electrical voltage including at least two input terminals 12 and at least two output terminals 14. The conversion system includes switching elements 16 positioned between the input terminals 12 and the output terminals 14, which are suitable for the conversion of the first voltage into the second voltage.

The conversion system is suitable for allowing the circulation of high electrical power, such as, for example, one greater than 1 MW.

Figure 1:
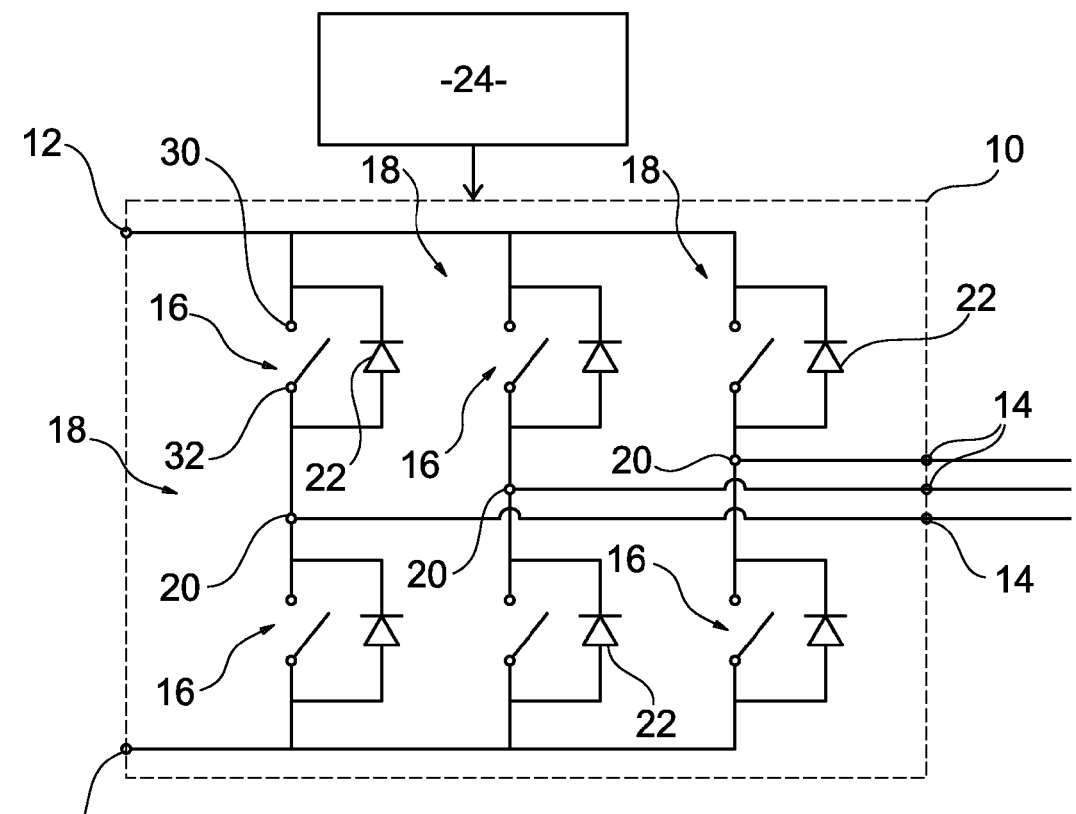
FIG. 1 is a schematic representation of a conversion system according to an embodiment of the present invention, including six switching elements suitable for converting the input voltage into an output voltage.

In the execution example in FIG. 1, the conversion system 10 is a voltage inverter suitable for converting a continuous input voltage received between the two input terminals 12 into an alternating output voltage delivered at each output terminal 14.

The voltage inverter 10 includes two switching paths 18 for each phase of the alternating output voltage, where each switching path 18 is connected between the corresponding output terminal 14 and a respective input terminal 12 and includes a switching element 16.

The voltage inverter includes a diode 22 connected in antiparallel to each switching element 16 and a means 24 for controlling the switching elements.

In the execution example in FIG. 1, the voltage inverter 10 is a three-phase inverter and includes three output terminals 14 and six switching paths 18, namely, an output terminal and two switching paths for each phase of the three-phase output voltage.

Figure 2:
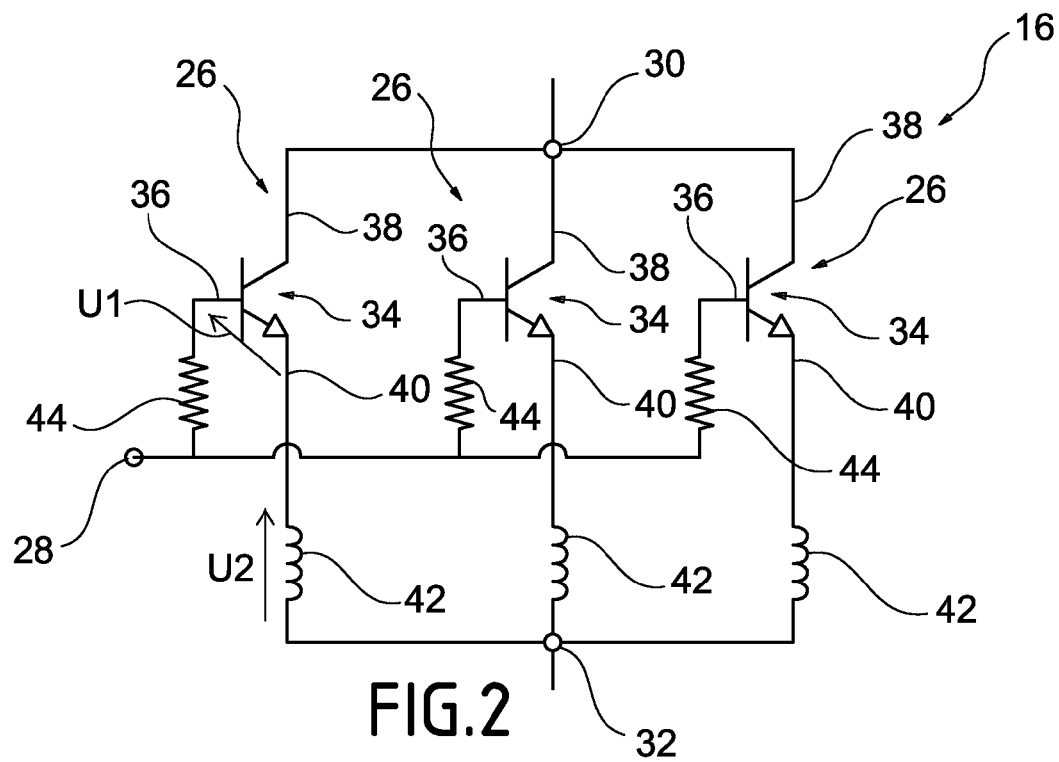
FIG. 2 is an electrical schematic of the switching element of FIG. 1 according to a first mode of execution.

The switching element 16, visible in FIG. 2, includes at least two arms 26 connected in parallel, a shared control terminal 28, a first shared conduction terminal 30 and a second shared conduction terminal 32.

In the execution example in FIG. 2, the switching element 16 includes three arms 26 connected in parallel.

In the execution example in FIGS. 1 and 2, each switching element 16 includes at least two arms 26 connected in parallel, more particularly three arms 26 connected in parallel.

Each arm 26 is connected between the first and second shared conduction terminals 30, 32, and comprises an electronic switch 34 which can be turned on and off; the switch 34 comprises a control electrode 36, a first conduction electrode 38 and a second conduction electrode 40.

According to an embodiment, each arm also includes an inductor 42 connected between the same electrode among the two conduction electrodes 38, 40 and the corresponding shared conduction terminal 30, 32.

In addition, each arm 26 includes a resistor 44 connected between the control electrode 36 and the shared control terminal 28.

The conversion system 10 also includes a printed circuit, not shown, which comprises conductor tracks between the electronic switches.

The shared control terminal 28 is connected, for example, by the intermediary of the resistor 44, to the control electrode 36 of the switch of each arm 26 connected in parallel. In other words, the shared control terminal 28 is connected to the control electrode 36 of each switch 34 of the switching element.

The first shared conduction terminal 30 is connected to the first conduction electrode 38 of the switch of each arm 26 connected in parallel. In other words, the first shared conduction terminal 30 is connected to the first conduction electrode 38 of each switch 34 of the switching element.

The second shared control terminal 32 is connected by the intermediary of the inductor 42 to the control electrode 40 of the switch of each arm 26 connected in parallel. In other words, the second terminal of conduction common 32 is connected via the inductor 42 to the second conduction electrode 40 of each switch 34 of the switching element.

The electronic switch 34 comprises at least one transistor among the group which includes: a bipolar transistor, a field-effect transistor, an IGBT transistor (Insulated Gate Bipolar Transistor) and an IEGT transistor (Injection Enhanced Gate Transistor). In the execution example in FIG. 2, each electronic switch 34 consists of an IGBT transistor.

The (or each) transistor in the switch 34 is, for example, suitable to allow the circulation of a current with a voltage equal to 1.2 kV or 600 V and a current equal to 30 or 40 A.

The switches in the same switching element 16 comprise transistors of the same type, namely bipolar transistors, field-effect transistors, IGBT transistors, or IEGT transistors. Transistors of the same switching element 16, although of the same type, are likely to display electrical characteristics that are noticeably different from one transistor to another.

The control electrode 36 is also referred to as the base electrode when the switch 34 includes a bipolar transistor. As an alternative, the control electrode 36 is also referred to as the grid electrode when switch 34 includes a field-effect transistor, an IGBT transistor or an IEGT transistor.

The first conduction electrode 38 and the second conduction electrode 40, are also referred to as a collector electrode and emitter electrode, respectively, when switch 34 comprises a bipolar transistor, an IGBT transistor or an IEGT transistor.

As an alternative, the first conduction electrode 38 and the second conduction electrode 40 are also referred to as the drain electrode and source electrode, respectively, when switch 34 comprises a field-effect transistor.

In the execution example in FIG. 2, the aforementioned electrode among both conduction electrodes 38, 40 which is connected to the inductor 42 is the second conduction electrode 40. In other words, the aforementioned electrode among the two conduction electrodes which is connected to inductor 42 is the emitter electrode when the transistor is a bipolar transistor, an IGBT transistor or an IEGT transistor. Alternatively, the aforementioned electrode among the two conduction electrodes which is connected to the resistor 42 is the source electrode when the transistor is a field-effect transistor.

The inductor 42 has a value L greater than 10 nH and is more or less identical for each of the arms 26 connected in parallel. The inductor 42, for example, has a value L between 10 nH and 100 nH.

The inductor 42 is, for example, a portion of track of printed circuit having a length greater than 1 cm, more particularly ranging between 1 cm and 10 cm, and ideally ranging between 2 cm and 5 cm. The width of the aforementioned portion of the track of printed circuit is approximately a few millimeters, for example between 1 mm and 5 mm.

As an alternative, the inductor 42 is a dedicated passive component.

The resistor 44 is a dedicated passive component and has value of approximately a few ohms.

During the operation of the conversion system, a control impulse is applied between the shared control terminal 28 and the second shared conduction terminal 32, for example an impulse of positive voltage, so that the corresponding switches 34 are in their "on" state. The current then circulates between the conduction electrodes 38, 40 of the switches, and more generally between the shared conduction terminals 30, 32. The positive voltage applied between the shared control terminal 28 and the second shared conduction terminal 32 corresponds to the sum of a first U1 voltage between the control electrode 36 and the second conduction electrode 40 of switch 34 and a second U2 voltage to the terminals of the corresponding inductor 42; the voltage at the terminals of resistor 44 is negligible.

The second U2 voltage at the terminals of the inductor is, for example, greater than the first U1 voltage at the terminals of the electrodes of the switch. When the control pulse has a voltage of 15 volts, the first U1 voltage is, for example, more or less equal to 5 volts, while the second U2 voltage is more or less equal to 10 volts.

Otherwise, the second U2 voltage is defined using the following equation:

$$U2 = L \times \left(\frac{di}{dt}\right) \quad (1)$$

In other words, the value L of the inductor 42 therefore makes it possible to check the gradient of the current i.

The switching properties of switches 34 are then virtually identical from one arm 26 to the other, which makes it possible to reduce the imbalance in the current between the arms 26.

The design of the conversion system 10 in accordance with an embodiment therefore makes it possible to reduce the imbalance in the current between the switches 34 arranged in the parallel arms 26 of the switching element 16, while still delivering a current with the same voltage and the same strength.

Figure 3:
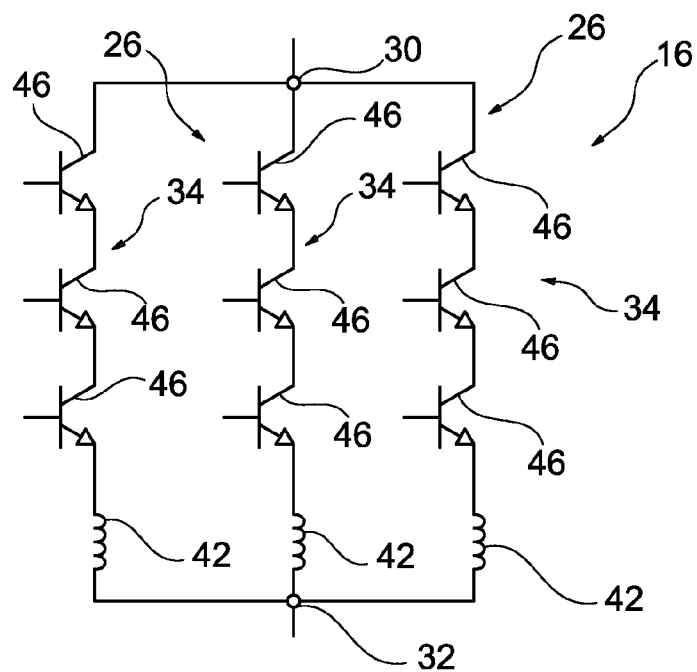
FIG. 3 is a similar view to that of FIG. 2 according to a second mode of execution.

FIG. 3 illustrates a second execution method according to an embodiment for which the same elements as for the first execution method, described above, are indicated by identical references and are therefore not described again.

According to the second execution method, the electronic switch 34 comprises a range of transistors 46 connected in series.

The first conduction electrode of the first transistor is connected to the first shared conduction terminal 30 and the second conduction electrode of the first transistor is connected to the first conduction electrode of the second transistor. The second conduction electrode of the second transistor is connected to the first conduction electrode of the following transistor, and so on. The second conduction electrode of the last of the transistors connected in series is connected via the inductor 42 to the second shared conduction terminal 32.

In the execution example in FIG. 3, the switching element 16 includes three arms 26 connected in parallel. Each arm 26 consists of a switch 34, and each switch 34 comprises three transistors 46 connected in series.

The operation of this second mode of execution is identical to that of the first execution method and is therefore not described again.

Connection in series of the transistors 46 makes it possible to obtain a greater delivered voltage, such as, for example, a voltage greater than 2.5 Kv, or actually allows the same delivered voltage to use transistors for lower voltage.

The other advantages of this second method of execution are identical to those of the first execution method and are therefore not described again.

Figure 4:
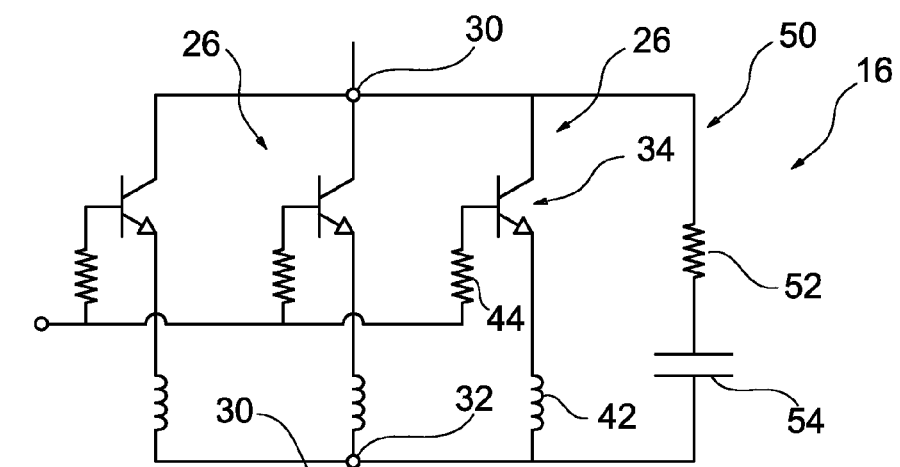
FIG. 4 is an electrical schematic of two switching elements connected in series according to a third mode of execution.
Figure 4:
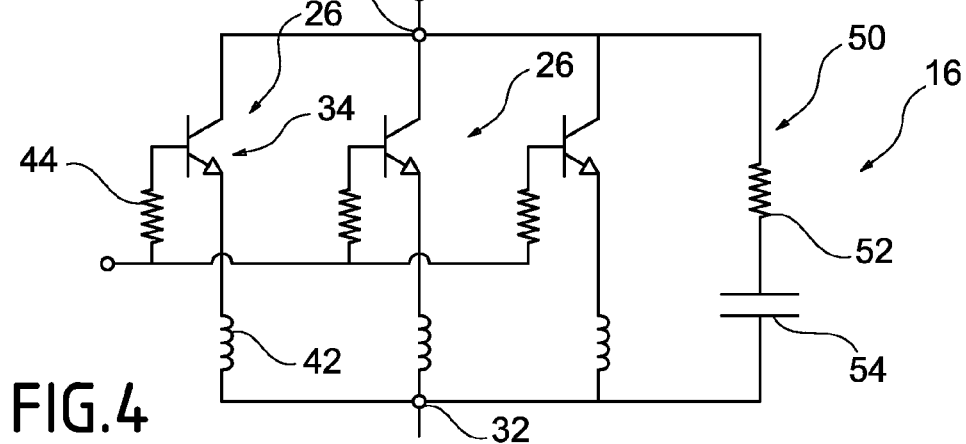

FIG. 4 illustrates a third method of execution of an embodiment for which the same elements used in the first method of execution, described previously, are indicated by identical references, and are therefore not described again.

According to the third method of execution, two switching elements 16 are connected in series.

Each switching path 18 comprises, for example, two switching elements 16 connected in series, in order to obtain a greater delivered voltage.

Each switching element 16 comprises at least two connected arms 26 in parallel and an additional arm 50 connected in parallel with the aforementioned arm 26 between the shared conduction terminals 30, 32.

In the execution example in FIG. 4, each switching element 16 includes three arms 26 connected in parallel, each arm 26 comprising the electronic switch 34, inductor 42 and resistor 44.

The control methods 24 are the control methods for the switches 34 of each of the switching elements.

The additional arm 50 comprises a resistor 52 and a capacitor 54 connected in series. In other words, each switching element 16 also includes, compared with the first mode of execution, the resistor 52 and capacitor 54 connected in series between the first shared conduction terminal 30 and second common conduction terminal 32.

As an alternative, the additional arm 50 includes only a capacitor in the absence of a resistor connected in series with the capacitor.

The resistor 52 is a damping resistor for the parasitic voltages that are likely to appear at high frequency, for example for frequencies greater than 1 MHz. The resistor 52 has an impedance of approximately several ohms.

The capacitor 54 is suited to absorbing a major portion of the current and to limiting the diversion of the voltage over time. The capacitor 54 has a capacity C with a value, for example, between N and 10×N nF, more particularly equal to 20 5×N nF, where N represents the number of arms 26 connected in parallel.

As an alternative, each switching element 16 comprises an additional arm 50 connected in parallel with each respective arm 26 between the shared conduction terminals 30, 32. In other words, each switching element 16 comprises N additional arms 50, where N represents the number of arms 26 connected in parallel. Each additional arm 50 comprises a resistor 52 and a capacitor 54 connected in series. According to this alternative, the capacitor 54 has a capacity of approximately several nF, of a value ranging, for example, between 1 and 10 nF, more particularly equal to 5 nF.

As an alternative, each additional arm 50 includes only a capacitor in the absence of a resistor connected in series with the capacitor.

During the switching of IGBT or IEGT transistors in switches 34, residual charges remain in the transistors and form parasitic currents, also known as tail currents. These tail currents create, in particular, imbalances in voltage at the level of the conduction terminals between the switching elements 16 in series.

These imbalances of voltage due to excess charges also appear during the switching of the diodes connected in antiparallel to each transistor, whether they are MOSFET, IGBT or IEGT transistors.

The capacitor 54 then makes it possible to convert the excess tail charges into a voltage V according to the equation:

$$dV = \left(\frac{dq}{C}\right) \quad (2)$$

The greater the value of capacity C of the capacitor 54, the weaker the imbalance of the voltage.

The presence of inductor 42 makes it possible to connect capacitor 54 in parallel with switches 34, because it limits the discharge current of capacitor 54.

The inductors 42 make it possible to reduce imbalances in the current between arms 26 connected in parallel, and the capacitors 54 make it possible to reduce imbalances in the voltage between the switching elements 16 connected in series.

The conversion system according to the third method of execution therefore makes it possible to obtain an output voltage of a higher value, while limiting imbalances in the voltage between the switching elements 16 connected in series, all while controlling the diversion over time of the terminal voltage of each switching element 16 via the value of the capacity of each capacitor 54. The other aspects of the operation of this third method of execution are the same as those of the first execution method described previously and are therefore not described again.

The other advantages of this third method of execution are the same as those of the first method of execution described previously, and are therefore not described again.

The conversion system 10 in accordance with an embodiment is also designed in such a way as to be able to reduce the imbalance in the current between the switches 34 arranged in parallel arms 26 of the switching element 16, during the switching phases of the switches 34, while still delivering an output voltage of a high value, such as, for example, a voltage greater than 2.5 Kv.

This written description uses examples to disclose the various embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for conversion of an initial electric voltage into a second electric voltage, the system comprising:
    a voltage inverter for converting DC power to AC power for use in a high power electrical circuit, the power being greater than 1 MW, the voltage inverter comprising:
    at least two input terminals and at least two output terminals;
    a plurality of switching elements positioned between the input terminals and the output terminals, the switching elements configured to convert an initial continuous electric voltage into an alternating second electric voltage, and
    a controller coupled to each of the switching elements for controlling the switching elements;
    wherein at least one of the switching elements comprises:
        at least two arms connected in parallel, each arm comprising an electronic switch switchable between an on state and an off state, the electronic switch comprising a control electrode (36), a first conduction electrode, and a second conduction electrode;
        a shared control terminal connected to the control electrode of the electronic switch of each arm connected in parallel, a first shared conduction terminal, and a second shared conduction terminal connected to, respectively, the first conduction electrode and the second conduction electrode of the electronic switch of each arm connected in parallel;
        for each arm connected in parallel, an inductor connected between one of the first and the second conduction electrodes, and the corresponding shared conduction terminal, the inductor being one of a portion of a track of a printed circuit, and a dedicated component, the inductor configured to reduce imbalances in the current between each of the at least two arms of the switching element; and
    the controller being configured to apply an impulse voltage between the shared control terminal and the second shared conduction terminal so that the at least one switching element is in an "on" state and allowing an output current to circulate between the first and second conduction electrodes of the at least one switching element.

2. The system according to claim 1, further comprising:
    at least two switching elements comprising:
        at least two arms connected in parallel, wherein the at least two switching elements are connected in series with each other, and wherein each of the at least two switching elements comprises a capacitor connected between the first shared conduction terminal and the second shared conduction terminal.

3. The system according to claim 2, wherein the at least two switching elements comprises one or more capacitors connected in parallel with the arms in the absence of a resistor connected in series with a corresponding capacitor.

4. The system according to claim 1, wherein each of the switching elements comprises at least two arms connected in parallel, and each of the at least two arms comprises a controllable electronic switch.

5. The system according to claim 1, wherein the electronic switch comprises at least one transistor among the group consisting of a bipolar transistor, a field-effect transistor, an IGBT transistor, and an IEGT transistor.

6. The system according to claim 5, wherein one of the first and the second conduction electrodes is an emitter electrode when the transistor is a bipolar transistor, an IGBT transistor or an IEGT transistor, and the other of the first and the second conduction electrodes is a source electrode when the transistor is a field-effect transistor.

7. The system according to claim 1, wherein the electronic switch comprises a variety of transistors connected in series.

8. The system according to claim 1, wherein the inductor has a value of between 10 nH and 100 nH.

9. The system according to claim 8, wherein the inductor is a portion of track having a length ranging between 1 cm and 10 cm.

10. The system according to claim 9, wherein the portion of track has a width ranging between 1 mm and 5 mm.

* * * * *

UNITED STATES PATENT AND TRADEMARK OFFICE
CERTIFICATE OF CORRECTION

| | | |
|---|---|---|
| PATENT NO. | : 9,467,064 B2 | Page 1 of 1 |
| APPLICATION NO. | : 14/342256 | |
| DATED | : October 11, 2016 | |
| INVENTOR(S) | : Permuy | |

It is certified that error appears in the above-identified patent and that said Letters Patent is hereby corrected as shown below:

On the Title Page

In Item (56), under "OTHER PUBLICATIONS", in Column 2, Line 1, delete "Electornic" and insert -- Electronic --, therefor.

In Item (56), under "OTHER PUBLICATIONS", in Column 2, Line 2, delete "Pennsylvainia," and insert -- Pennsylvania, --, therefor.

In the Specification

In Column 4, Line 33, delete "resistor 42" and insert -- resistor 44 --, therefor.

In the Claims

In Column 7, Lines 49-50, in Claim 1, delete "voltage, and" and insert -- voltage; and --, therefor.

Signed and Sealed this
Twenty-first Day of February, 2017

Michelle K. Lee
*Director of the United States Patent and Trademark Office*